T. C. DILL.
POWER TRANSMISSION MECHANISM.
APPLICATION FILED SEPT. 20, 1909.
970,995.
Patented Sept. 20, 1910.
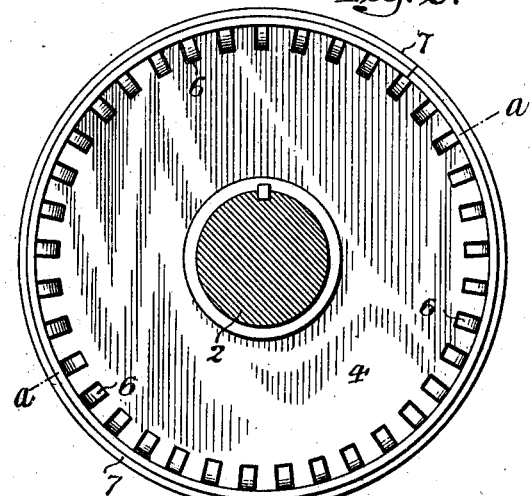
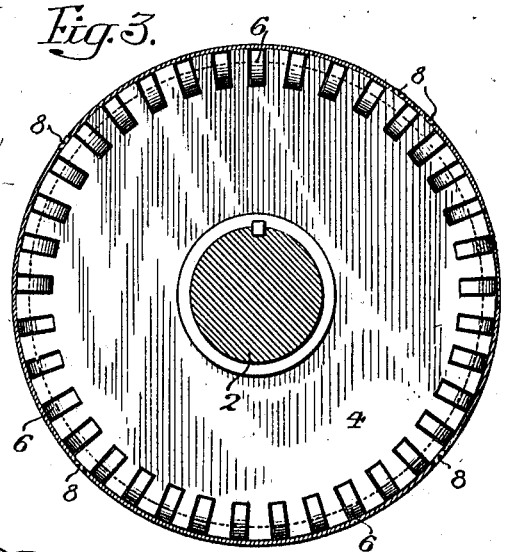
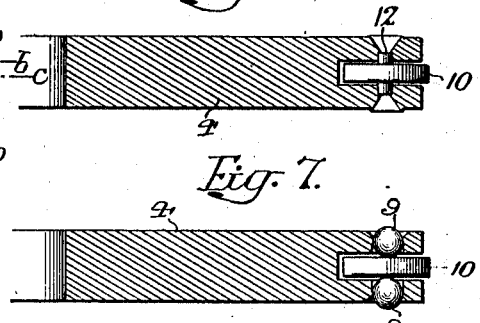
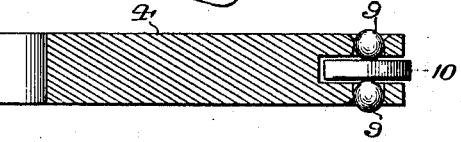
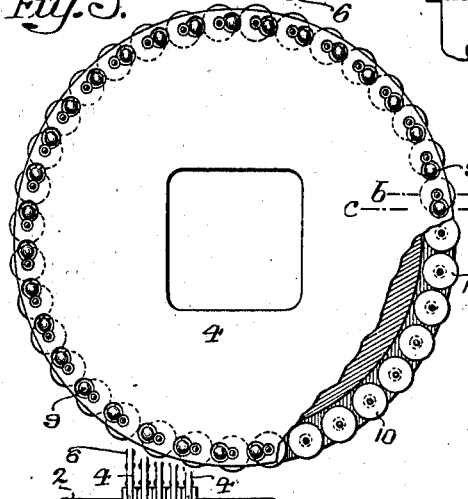
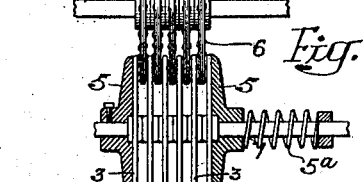
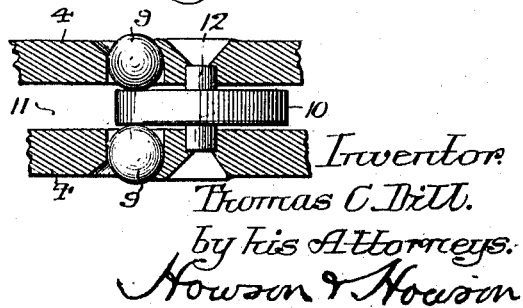
Witnesses
Titus H. Irons
Willa H. Burrowes
Inventor
Thomas C. Dill.
by his Attorneys
Howson & Howson

UNITED STATES PATENT OFFICE.

THOMAS C. DILL, OF PHILADELPHIA, PENNSYLVANIA.

POWER-TRANSMISSION MECHANISM.

970,995.  Specification of Letters Patent.  Patented Sept. 20, 1910.

Application filed September 20, 1909. Serial No. 518,635.

*To all whom it may concern:*

Be it known that I, THOMAS C. DILL, a citizen of the United States, residing in Philadelphia, Pennsylvania, have invented certain Improvements in Power - Transmission Mechanism, of which the following is a specification.

My invention relates to that particular class of power transmission mechanism employing in its simplest form two series of intermeshing disks mounted upon two parallel shafts, of which one is the driving and the other is the driven member;—one object of the invention being to provide such mechanism with novel means for increasing its efficiency of operation.

I also desire to provide a disk for use in power transmission apparatus, such as that above noted, which shall be provided with means whereby the friction between it and the adjacent disks shall be reduced to a minimum.

Another object of the invention is to provide a relatively simple form of anti-friction device for use in connection with power transmission apparatus employing intermeshing disks, it being also desired that said device shall be of such nature as to be conveniently applied to the peripheries of the power transmssion disks.

A further object of the invention is to provide a power transmission disk with a relatively simple and durable form of anti-friction device whereby the loss due to the friction between the intermeshing disks shall be reduced to the lowest possible point, and the apparatus, as a whole, thereby made highly efficient and inexpensive to maintain under operating conditions.

These objects and other advantageous ends I secure as hereinafter set forth, reference being had to the accompanying drawings, in which:—

Figure 1, is a plan, to some extent diagrammatic, illustrating a simple form of power transmission apparatus constructed according to my invention, Fig. 2, is a side elevation of one form of my improved power transmission disk, Fig. 3, is a side elevation similar to Fig. 2 but with the roller retaining band partially removed, Fig. 4, is a vertical section of the line $a$—$a$, Fig. 2. Fig. 5, is a side elevation of a disk provided with a slightly modified form of my invention. Figs. 6 and 7 are enlarged vertical sections taken on the lines $b$—$b$ and $c$—$c$, respectively of Fig. 5, and, Fig. 8, is a vertical section on a still larger scale, further illustrating the detail construction of the anti-friction devices or bearings employed in that form of my invention shown in Figs. 5, 6, and 7.

In Fig. 1, of the above drawings, 1 and 2 are two parallel shafts mounted in suitable bearings, one of them being connected to a source of power and the other to a device to be driven. On one of the shafts, in the present instance that indicated at 1, there is mounted a series of parallel-sided disks 3, usually of hardened steel, which are fixed to this shaft in any desired manner;—there being provided end or backing plates 5, having extended hubs whereby they, as well as the disks between them, are prevented from tilting upon their supporting shaft. A spring $5^a$ is employed to press the various disks together.

Upon the shaft 2 is mounted a second series of disks 4 which are likewise keyed to it and respectively extend between the disks 3. Each of these disks 4 has mounted in the outermost portions of its side faces a series of anti-friction elements which in the preferred form of my invention, consist of any suitable number of pairs of hardened steel rollers 6 mounted in radially placed slots formed in the edges of each disk. The rollers of each pair are loosely mounted in their particular slot in such positions that they lie in radial planes of the disk, or, in other words, so that their axes are tangent to a circle described from the center of the disk, although I do not limit myself to such positioning, as in some cases the rollers may be more or less inclined to radial planes of the disk.

A ring 7, having its edges inwardly flanged, is mounted upon the edge of each disk, so that its flanges keep all of the rollers from coming out of their slots. Said rollers are of such dimensions that the sum of the diameters of each pair is greater than the thickness of the disk 4, and the width of the ring 7 is less than the sum of said diameters. Said ring is preferably held in position by a number of screws 8, or its ends may be brazed or welded or otherwise held in position.

Under operating conditions, each disk 4 has on each side of it a plane disk 3 and when power is transmitted from one series of disks to the other, those rollers engaged by the plane disks turn as they move over one of said plane disks from its periphery toward the line joining the centers of the disks. The speed of rotation of each roller diminishes from the periphery inwardly until it becomes zero when said roller reaches this line, and as the roller passes beyond said line joining the centers of the shafts, the direction of its rotation is reversed and its speed increases until it finally passes out of engagement with the plane disk.

Since the rollers are mounted in pairs, the individual members of which rest upon each other, and since all of the plane disks move at the same speed, each roller of each pair acts as a supporting means for the other roller; the two mutually rolling one upon the other at the same speed. By reason of this construction the friction between the two series of disks is materially less than is the case where the disks of each series are plane, or where one set is plane and the other is composed of tapering or conical disks.

In the modified form of my invention, the anti-friction elements for the periphery of each of the disks 4 consist of balls 9 projecting slightly beyond the faces of the disk;—the balls being grouped in pairs and those of each pair having interposed between them a rotary plate 10, upon which they rest. All of these plates are mounted within a peripheral slot 11 formed in the edge of the disk 4, parallel with the general plane of said disk, and are each provided with a supporting spindle 12 mounted in bearings in the disk. Each bearing consists of a cylindrical recess, whose outer end has a conical form, and each of the balls rests in a cylindrical hole adjacent to the edge of the disk 4, being held in this so as to rest upon the plate 10 by a displaced portion of the wall separating said hole from the conical recess leading to the bearing for the spindle 12.

Under operating conditions it is obvious that each of the balls 9 bears upon one of the plane disks over a relatively small area which is in effect a point, while each of the rollers 6, under similar conditions, bears upon the plane disk in a line contact. Since by reason of the fact that the balls have a "point" bearing, they are theoretically a more perfect anti-friction bearing, than are the rollers 6, though these latter are preferred under working conditions because of the greater bearing surface between them and the plane disks. In some instances, however, it may be advisable to employ the constructions shown in Figs. 5 to 8 inclusive, and in use both balls 9 of each pair turn at the same speed and simultaneously roll upon the plate 10 so as to turn this on its axis.

While in Fig. 1, I have shown five plane disks intermeshing with the same number of disks having anti-friction rollers, it is obvious that any desired or practical number of disks may be used without departing from my invention.

I claim:—

1. A new article of manufacture consisting of a power transmission disk having anti-friction devices mounted to project beyond its side faces adjacent to its edge.

2. A new article of manufacture consisting of a power transmission disk having a series of recesses adjacent to its edge, and a plurality of pairs of anti-friction elements mounted in said recesses so as to project beyond its side faces.

3. A new article of manufacture consisting of a power transmission disk having mounted adjacent to its periphery a series of pairs of co-acting anti-friction elements; the elements of each pair respectively projecting beyond its side faces.

4. A new article of manufacture consisting of a power transmission disk having mounted adjacent to its periphery a number of pairs of anti-friction elements, one element of each pair projecting beyond one face of the disk and the other projecting beyond the other face thereof.

5. A new article of manufacture consisting of a power transmission disk having a series of slots; with a pair of co-acting anti-friction rollers mounted in each slot and respectively projecting beyond the side faces of the disk.

6. A new article of manufacture consisting of a power transmission disk having a series of slots; a pair of co-acting anti-friction rollers mounted in each slot; with means for holding said rollers in their respective slots while permitting them to respectively project beyond the side faces of the disk.

7. A new article of manufacture consisting of a power transmission disk having a series of slots adjacent to its periphery, with a pair of rollers loosely mounted in each slot in engagement with each other, and means for holding said rollers in their slots so that they project beyond the faces of the disk.

8. The combination of two parallel shafts; and intermeshing disks respectively mounted on said shafts; certain of said disks being provided with anti-friction devices placed adjacent to their edges in position to engage the sides of others of the disks.

9. The combination of two parallel shafts, a series of smooth-faced disks on one shaft and a second series of disks mounted on the other shaft so as to intermesh with said smooth-faced disks, the disks of said second series each having a series of anti-friction elements projecting from each of its faces.

10. The combination of two parallel shafts, a series of smooth-faced disks on one shaft, and a second series of disks mounted on the other shaft so as to intermesh with said smooth faced disks, the disks of said second series each having a series of anti-friction elements projecting from each of its faces, and the anti-friction elements of one face of each disk co-acting with those of the other face thereof.

11. The combination of two parallel shafts, a series of smooth-faced disks mounted on one shaft, a second series of disks mounted on the other shaft so as to mesh with the disks of the first series, said second series of disks having slots adjacent to their edges, and a pair of rollers mounted in each slot so as to project beyond the respective faces of the disk while engaging each other.

In testimony whereof, I have signed my name to this specification, in the presence of two subscribing witnesses.

THOMAS C. DILL.

Witnesses:
WILLIAM E. BRADLEY,
WM. A. BARR.